Sept. 7, 1965 W. J. BERNARD ETAL 3,205,416
ELECTROLYTIC CAPACITOR WITH NON-FILM-DISSOLVING ELECTROLYTE
Filed Jan. 14, 1960
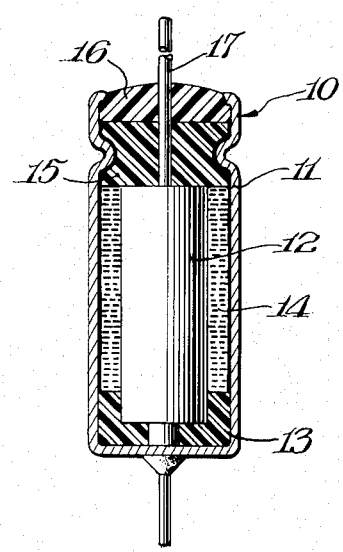
INVENTORS.
WALTER J. BERNARD
JAMES W. COOK
BY *Connolly and Hutz*
THEIR ATTORNEYS

3,205,416
ELECTROLYTIC CAPACITOR WITH NON-FILM-DISSOLVING ELECTROLYTE

Walter J. Bernard, Williamstown, Mass., and James W. Cook, Richmond, Va., assignors to Sprague Electric Company, North Adams, Mass., a corporation of Massachusetts
Filed Jan. 14, 1960, Ser. No. 2,482
2 Claims. (Cl. 317—230)

The present invention relates to an electrolytic capacitor and, more particularly, to the electrolyte employed therein. More specifically, the invention relates to a capacitor having a tantalum electrode and an electrolyte which is especially adapted for use with this type of electrode.

Electrolytic capacitors, in their usual form, comprise two electrodes, at least one of which is a film-forming metal, along with an electrolyte. The capacity effect is due mainly to the dielectric properties of the film formed on the metallic electrode. A preferred modification of such a capacitor employs a tantalum anode in a silver cathode can, the space between these two elements being filled by a suitable electrolyte. Since the capacity of a condenser is proportionate to the effective area of the electrode and inversely proportionate with the thickness of the dielectric layer, a preferred form of tantalum anode is one having a sintered tantalum core covered by a thin layer of tantalum oxide. This combination must, of course, be sealed into the cathode can in such a way as to prevent loss of electrolyte and to insulate the electrodes from each other.

Since the surface area of the tantalum metal and its oxide film determines the capacitance of the anode, it is important that the oxide film not deteriorate during storage. This means that, if the capacitor is to have a long shelf life, i.e., show practically no change in capacitance after thousands of hours of storage, the electrolyte must be chemically inert to the tantalum oxide film. Unfortunately, tantalum oxide is susceptible to attack by alkaline electrolytes because it is soluble in basic solutions to some extent, although completely stable in acid solutions. The tantalum oxide dissolution may proceed according to this reaction:

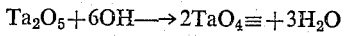

$$Ta_2O_5 + 6OH^- \rightarrow 2TaO_4^{\equiv} + 3H_2O$$

The dissolution rate increases with an increase in pH. Hence, some tantalum capacitors containing an alkaline electrolyte will show a large and undesirable increase in capacity after a long period of storage. The disadvantage of this is obvious since it means that the capacitor cannot be depended upon to exhibit the capacitance at which it was rated prior to storage. Some of the best electrolytes tend to become alkaline over a period of time due to certain reactions which set in in an electrolytic capacitor. An example of this is a lithium chloride solution which is, otherwise, an excellent electrolyte because of its high conductivity, stability to decomposition, non-corrosiveness, and low vapor pressure. Potassium formate, another good electrolyte, will also attack a tantalum oxide film.

It is evident, therefore, that there is need for an invention which will inhibit basic electrolytes from attacking tantalum capacitors. Accordingly, the objective of the present invention is to provide an electrolyte for tantalum electrodes which will not attack the oxide film thereon even though the electrolyte is alkaline or becomes alkaline during service.

The inventors have found that the above object can be obtained by the addition of a silicate ion to a basic electrolyte or to one which becomes basic in use. Specifically, the addition of silica or a silicate to an aqueous alkaline electrolyte will prevent, or at least greatly reduce, the attack by the electrolyte on the tantalum oxide surface of a tantalum electrode. This permits the use of such excellent alkaline electrolytes as potassium formate, as well as the use of lithium chloride solutions which often become alkaline in use by picking up OH ions. While the invention is applicable to any basic electrolytes, potassium formate, HCOOK, is the preferred one because of its high water-solubility, low freezing point, and especially the high conductivity needed in pellet-type tantalum capacitors.

The drawing illustrates a sectional view of an electrolytic capacitor in which the new electrolyte solutions are particularly useful. In this drawing, the capacitor 10 comprises a silver can 11 containing a pellet-type anode 12, the latter being composed of tantalum particles that have been sintered together. The anode 12 has a riser 17 and is immersed in electrolyte 14 and mounted on a spacer 13 fitted into the base of can 11. In order to secure anode 12 against rotation, a plug 15 of a suitable material such as Teflon is fitted into the niche of can 11. Over this is positioned a wafer gasket 16 which is more resilient than the Teflon of plug 15 so as to prevent any leakage of electrolyte from the top of can 11. However, it should be pointed out that the sealing elements form no part of this invention and many types could be used other than that shown in the drawing. The important feature is electrolyte 14 which will be considered as an aqueous solution of potassium formate containing a small amount of silica.

Pellet-type anode 12 is created from fine grain tantalum particles sintered into a pellet having a density of about 8 grams per cubic centimeter. Any suitable wax or resin binder may be employed to cohere the particles together. An oxide is formed on this anode by passing a current through an electrolyte in contact with the anode resulting in the formation of $Ta_2O_5$ on the surface of the anode. This tantalum oxide coating is a dielectric in contact with an electrolyte such as lithium chloride. The silver can 11 acts as a container and a cathode for the capacitor.

In a specific embodiment of the invention, the capacitance of an aqueous 9 M potassium formate electrolyte was compared as a control with that of three other electrolytes differing from the control only by the addition of various concentrations of silica, specifically 2.0%, 0.2%, and 0.02% silica. The silica was in the form of sodium silicate. After 300 hours, the capacitor containing the control electrolyte began to show a capacitance increase; and, within another 300 hours, the capacity was twice its original value. On the other hand, all the capacitors containing silica showed an initial small capacity decrease and then remained constant. This was true even for the lowest silica concentration (0.02% or 200 p.p.m.). These results clearly show the inhibiting effect of silica.

The previous use of silica in this art has, so far as we know, been limited to the prevention of hydration of aluminum oxide electrodes; and, in that embodiment, the silicate compound was added to an aqueous electrolyte without regard to whether it was acidic or basic; and it was necessary for an ammonium compound to be present with the silicate in order to prevent formation of a hydrate film on the aluminum electrode. In the present invention, however, silica is employed only with tantalum electrodes, preferably those of the sintered pellet-type; end their utility is specific to alkaline electrolytes which may dissolve the tantalum oxide film. It is presumed that the silica functions as an adsorbed layer or actually undergoes chemical exchange to form insoluble tantalum silicate. This does not restrict the electrolyte to any particular salts such as borate salts or ammonium salts; but, instead, the electrolyte can be any solution which is normally alkaline or which could become alkaline during service, such as a lithium chloride solution. The mechanism by which the latter becomes alkaline if unbuffered is explained in detail in U.S. 2,862,157.

The siliceous materials useful in the present invention are selected from the group consisting of silica, alkali silicates, and organic silicon compounds which hydrolyze with the electrolyte to form silica, e.g., silicic acid esters such as the alkyl silicates. The preferred silicate is sodium silicate or sodium meta-silicate, although other alkali metal silicates such as potassium silicate are also operative. Other inorganic silicates such as the sesquisilicates and orthosilicates may be used; and, in general, all water-soluble silicates are satisfactory. The silicic acid esters are best represented by organic silicates such as tetraalkylorthosilicates.

Generally, the siliceous material should be sufficiently water-soluble to produce a solution of at least 200–20,000 p.p.m. in water, water-solubility being of some importance in an aqueous electrolyte. The use of less than 200 p.p.m. of the silicate is inconvenient; whereas, more than 20,000 p.p.m. begins to lower the conductivity of the electrolyte without offering a compensating advantage.

It should be understood that the particular embodiments disclosed herein are illustrative of the invention but not limiting since various modifications may be made within the scope of the invention. For example, while a specific embodiment of the invention using potassium formate is described, there are other compounds of this type which are operative such as sodium formate and potassium or sodium acetates.

What is claimed is:

1. An electrolytic capacitor comprising a sintered tantalum electrode having a tantalum oxide film thereon, and an alkaline electrolyte having the ability to dissolve the tantalum oxide film, said electrolyte being inhibited against such dissolving action by the addition thereto of about 200 to 20,000 p.p.m. of siliceous material.

2. The capacitor of claim 1 wherein said electrolyte is a solution of potassium formate and said siliceous material is silica.

References Cited by the Examiner
UNITED STATES PATENTS

| | | | |
|---|---|---|---|
| 732,631 | 6/03 | Hambuechen | 317—233 |
| 1,056,327 | 3/13 | Fallek | 317—230 |
| 1,748,011 | 2/30 | Dooley | 317—230 |
| 2,022,500 | 11/35 | Clark | 317—230 |
| 2,862,157 | 11/58 | Haring et al. | 317—230 |
| 2,890,394 | 6/59 | Stephenson | 317—230 |

DAVID J. GALVIN, *Primary Examiner.*

SAMUEL BERNSTEIN, JOHN W. HUCKERT,
*Examiners.*